United States Patent
Kliesch et al.

(10) Patent No.: US 8,710,121 B2
(45) Date of Patent: *Apr. 29, 2014

(54) BIAXIALLY ORIENTED HYDROLYSIS-STABLE POLYESTER FILM COMPRISING EPOXIDIZED FATTY ACID DERIVATIVES AND A CHAIN EXTENDER, AND PROCESS FOR PRODUCTION THEREOF AND USE THEREOF

(75) Inventors: Holger Kliesch, Ginsheim (DE); Bodo Kuhmann, Runkel (DE); Thomas Hackl, Huenstetten (DE); Dagmar Klein, Ockenheim (DE); Ingo Fischer, Heistenbach (DE); Annegrete Bursch, Ruedesheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 237 days.

This patent is subject to a terminal disclaimer.

(21) Appl. No.: 12/384,240

(22) Filed: Apr. 2, 2009

(65) Prior Publication Data

US 2010/0256261 A1    Oct. 7, 2010

(30) Foreign Application Priority Data

Nov. 11, 2008  (DE) .......................... 10 2008 056 692

(51) Int. Cl.
| | | |
|---|---|---|
| C08G 59/38 | (2006.01) | |
| C08G 59/20 | (2006.01) | |
| B29C 47/14 | (2006.01) | |
| B29C 55/12 | (2006.01) | |

(52) U.S. Cl.
USPC .......................... 523/427; 525/438; 264/210.6

(58) Field of Classification Search
USPC .......................... 523/427; 525/438; 264/210.6
See application file for complete search history.

(56) References Cited

U.S. PATENT DOCUMENTS

| | | | |
|---|---|---|---|
| 3,432,591 A | | 3/1969 | Heffelfinger |
| 3,657,191 A | | 4/1972 | Titzmann |
| 3,770,675 A | * | 11/1973 | Taft ............................ 525/111.5 |
| 3,981,737 A | | 9/1976 | Evilampi et al. |
| 5,885,709 A | | 3/1999 | Wick et al. |
| 6,469,078 B1 | * | 10/2002 | Simon et al. .................. 524/139 |
| 6,984,694 B2 | | 1/2006 | Blasius, Jr. et al. |
| 7,241,507 B2 | * | 7/2007 | Kliesch et al. ................ 428/480 |
| 7,794,822 B2 | * | 9/2010 | Kliesch et al. ................ 428/212 |
| 2007/0238816 A1 | | 10/2007 | Kliesch et al. |
| 2007/0299184 A1 | | 12/2007 | Bloom |

FOREIGN PATENT DOCUMENTS

| | | |
|---|---|---|
| CH | 621 135 A5 | 1/1981 |
| EP | 0 292 251 A2 | 11/1988 |
| EP | 0 738 749 A1 | 10/1996 |
| EP | 0 838 500 A2 | 4/1998 |
| EP | 0 861 299 B1 | 9/1998 |
| EP | 1 054 031 A2 | 11/2000 |
| EP | 1 634 914 A1 | 3/2006 |
| EP | 1 842 662 A1 | 10/2007 |
| EP | 1 842 871 A1 | 10/2007 |
| FR | 2 812 299 A1 | 2/2002 |
| JP | 2005-517061 A1 | 8/2003 |
| JP | 2006-77250 | 3/2006 |
| JP | 2007-302845 | 11/2007 |
| WO | WO 2004/069912 A5 | 8/2004 |

OTHER PUBLICATIONS

Shenwei Li, *Studies on Preparing Biodegradable Copolyester Film*, China Master's theses full text database (monthly) 2007 No. 5 Polymer Research Institute of Sichuan University (abstract).

* cited by examiner

*Primary Examiner* — Tae H Yoon
(74) *Attorney, Agent, or Firm* — ProPat, L.L.C.

(57) ABSTRACT

The invention relates to biaxially oriented polyester films which contain 0.25-20% by weight (based on the weight of the film) of a hydrolysis stabilizer based on epoxidized fatty acid esters and/or epoxidized fatty acid glycerides, and a chain extender. Such films find use in outdoor applications, as a ribbon cable, as a backside laminate of solar modules and in electrical insulation applications.

16 Claims, No Drawings

BIAXIALLY ORIENTED HYDROLYSIS-STABLE POLYESTER FILM COMPRISING EPOXIDIZED FATTY ACID DERIVATIVES AND A CHAIN EXTENDER, AND PROCESS FOR PRODUCTION THEREOF AND USE THEREOF

Biaxially oriented hydrolysis-stable polyester film comprising epoxidized fatty acid derivatives and a chain extender, and process for production thereof and use thereof

CROSS-REFERENCE TO RELATED APPLICATIONS

This application claims priority to German Patent Application 10 2008 056 692.6 filed Nov. 11, 2008 which is hereby incorporated herein by reference in its entirety.

FIELD OF THE INVENTION

The invention relates to a biaxially stretched hydrolysis-resistant film composed of a polyester, whose thickness is preferably within the range from 11 to 500 µm. The film comprises at least one hydrolysis stabilizer and a chain extender and is notable for its low hydrolysis rate. The invention further relates to a process for producing the film and to the use thereof.

BACKGROUND OF THE INVENTION

Films composed of polyesters within the thickness range specified are sufficiently well known. However, a disadvantage of such polyester films is their hydrolysis tendency, especially at temperatures above the glass transition temperature of the particular polyester. In this context, the hydrolysis tendency is understood to mean the property of the polyester of being degraded hydrolytically under moist conditions, which is noticeable, for example, by a reduction in the IV or SV. This is a limiting factor for the use of polyester films especially in applications with relatively high thermal stress, such as in film capacitors, cable sheathing, ribbon cables, engine protection films, but also in long-term applications such as in glazing and outdoor applications, and especially in the backside laminate of solar modules.

The hydrolysis tendency is particularly marked in the case of aliphatic polyesters, but also in the case of aromatic polyesters such as PBT and PET. When the hydrolysis tendency of PET becomes too great for the application, it is necessary to revert to the more hydrolysis-stable PEN or even to other polymers, for example polyetherimides or polyimides. However, these are significantly more expensive than PET and are therefore frequently no solution for economic reasons.

It has therefore already been proposed to improve the hydrolysis stability of polyester films through the incorporation of hydrolysis stabilizers.

More hydrolysis-resistant polyester raw materials which are obtained through use of carbodiimides, and fibers and films produced therefrom, are known (U.S. Pat. No. 5,885,709, EP-A-0 838 500, CH-A-621 135). Films which are produced from such raw materials, however, tend both in production and in later use to outgas isocyanates and other mucosa-irritant or harmful by-products and degradation products. This is a much greater problem in flat structures such as films with a large surface area than, for example, in injection moldings.

Hydrolysis stabilizers based on terminal epoxy groups can likewise lead to hydrolysis stabilization and are described, for example, in EP-A-0 292 251 or U.S. Pat. No. 3,657,191. Frequently, the incorporation of such compounds into the polyester matrix is inadequate, which leads to breakoffs in the production process in the case of stretched polyester films. Owing to the poor incorporation, in addition, only a portion of the epoxy functions react with the polyester. The remainder react with each other and lead to gelation of the material used. The reactivity of such epoxy functions with polyesters and with each other in the extrusion is very high, such that the hydrolysis stabilization is based here essentially on an initial molecular weight rise (i.e. the films possess a higher IV or SV from the start and therefore need somewhat longer in order to degrade it hydrolytically than identical films with an initially lower IV/SV), with a secondary effect via a reduction of the carboxyl end groups. True stabilization by means of a stabilizer which is still active in the end product and continues to actively offer hydrolysis stabilization in the lifetime of the end product cannot really be achieved by this method. If anything, this is a chain extension and not true hydrolysis stabilization.

Moreover, known hydrolysis stabilizers such as carbodiimides and other substances, as described in EP-A-0 292 251, have the disadvantage that, owing to their chain-extending action, they lead partially to significant, abrupt molecular weight increases (viscosity rise) in the polymer during extrusion, thus making the extrusion process unstable and difficult to control.

In addition, polyester films with epoxidized vegetable oils as stabilizers are described in EP-A-1 634 914 and EP-A-1 842 871. The toxic degradation products which are typical of carbodiimides do not occur here, the incorporation into the polyester matrix is good given suitable selection of the oils, and there is good hydrolysis stabilization of the films. Disadvantages which occur in application are, however, viscosity variations in production, especially toward lower viscosities. This viscosity reduction is noticeable particularly in the case of extrusion in the melt and leads to varying pressures. These lead to thickness variations of the extruded preliminary film and as a consequence to breakoffs in production.

An increase in the viscosity, especially during the extrusion, could be achieved through the use of chain extenders.

Chain extenders for polyesters are likewise known and are described, for example, in EP-A-1 054 031. This publication describes the use of anhydrides, especially pyromellitic anhydride, as an effective constituent of the inventive formulation.

Chain extenders for PET, which are based on oxazolines or caprolactams, are sold by DSM (the Netherlands) under the brand name ALLINCO®.

Chain extenders with epoxy functions are described in U.S. Pat. No. 6,984,694 among other documents and are commercially available under the brand name JONCRYL® from BASF (Germany).

Polymers with glycidyl end groups, which are likewise suitable in principle as chain extenders for PET, are sold under the brand names EPON® by Hexion (USA) or LOTADER® by Arkema (France).

Even though they are well known as described above, chain extenders have to date not found any significant use in industrial practice in the production of polyester films.

SUMMARY OF ADVANTAGEOUS EMBODIMENTS OF THE INVENTION

It is an object of the present invention to provide a hydrolysis-stable polyester film which avoids the disadvantages of the prior art described. A stable and high viscosity level should be achieved, without gels occurring to a significant degree. The film should be producible in an economically viable manner. The viscosity in the extrusion should vary to a minimum degree (and not in the upward direction either) and, more particularly, the frequency of drops in the viscosity in the extrusion, as a consequence of which film breakoffs occur, should be <4 per day. The hydrolysis stability of the film should be impaired to a minor degree or ideally not at all by the measures for viscosity stabilization.

DETAILED DESCRIPTION OF ADVANTAGEOUS EMBODIMENTS OF THE INVENTION

This object is achieved by a polyester film which, as well as polyester, contains 0.25-20% by weight (based on the weight of the film) of a hydrolysis stabilizer based on epoxidized fatty acid esters and/or epoxidized fatty acid glycerides. The film further comprises a chain extender.

The film comprises, as the main constituent, a polyester. Suitable polyesters are, for example, polyethylene terephthalate (PET), polyethylene naphthalate (PEN), polybutylene terephthalate (PBT), polytrimethylene terephthalate (PTT), bibenzoyl-modified polyethylene terephthalate (PETBB), bibenzoyl-modified polybutylene terephthalate (PBTBB), bibenzoyl-modified polyethylene naphthalate (PENBB) or mixtures thereof, preference being given to PET, PBT, PEN and PTT, and mixtures and copolyesters thereof.

To prepare the polyesters, in addition to the main monomers such as dimethyl terephthalate (DMT), ethylene glycol (EG), propylene glycol (PG), 1,4-butanediol, terephthalic acid (TA), benzenedicarboxylic acid and/or 2,6-naphthalenedicarboxylic acid (NDA), it is also possible to use isophthalic acid (IPA), trans- and/or cis-1,4-cyclohexanedimethanol (c-CHDM, t-CHDM or c/t-CHDM), neopentyl glycol and other suitable dicarboxylic acid components (or dicarboxylic esters) and diol components.

Preference is given to polyesters in which the dicarboxylic acid component consists of terephthalic acid (TA) to an extent of 90% by weight (based on the total amount of the dicarboxylic acid component) and more, especially to an extent of 95% by weight and more. Preference is further given to polyesters in which the diol component consists of ethylene glycol (EG) to an extent of 90% by weight and more, especially to an extent of 93% by weight (based on the total amount of the diols) and more. Preference is also given to polymers in which the diethylene glycol content (DEG) in the overall polymer is in the range from 0.25 to 3% by weight. Particular preference is given to a DEG content of 0.75-1.5% by weight, since the most stable running reliability is achieved within these limits, with simultaneously the best hydrolysis stability. In all amounts stated in this paragraph, the hydrolysis stabilizer and the chain extender are disregarded.

The carboxyl end group content of the polyesters used is typically >3 mmol/kg and more preferably >10 mmol/kg and ideally >15 mmol/kg. The higher the carboxyl end group content, the greater the achievable viscosity rise by virtue of the preferred chain extenders. Chain extenders can act particularly effectively when at least one polyester whose carboxyl end group content is greater than 30 mmol/kg is used to an extent of at least 5% by weight (based on the total weight of the film). The carboxyl end group content is determined by known methods by means of titration.

The film according to the invention may further comprise inorganic or organic particles which are required to adjust the surface topography or appearance (gloss, haze, etc.). Such particles are, for example, calcium carbonate, apatite, silicon dioxide, titanium dioxide, aluminum oxide, crosslinked polystyrene, crosslinked polymethyl methacrylate (PMMA), zeolites and other silicates such as aluminum silicates. These compounds are used generally in amounts of 0.05 to 5% by weight, preferably 0.1 to 0.6% by weight (based on the weight of the film). Particular preference is given to calcium carbonate and silicon dioxide.

To achieve good running reliability in production, the particle sizes $d_{50}$ used are generally between 0.1 and 20 µm and preferably between 0.3 and 7 µm and more preferably between 0.5 and 5 µm. Fibrous inorganic additives such as glass fibers are unsuitable since they make the production of the polyester film uneconomic as a result of many breakoffs.

All particle sizes stated are based on the $d_{50}$ value before the incorporation of the particles into the polymer.

In a preferred embodiment, the film is white. Suitable white pigments are especially titanium dioxide, barium sulfate, or incompatible polymers such as polypropylene, polyethylene or COC (the use of incompatible polymers is less preferred than the use of white pigments, since the thermal stability of such white films is less good than with inorganic white pigments), or combinations thereof. These are added to the polyester in an amount of 1-35% by weight, the preferred amount added being between 2 and 20% by weight (based on the total weight of the film). In this embodiment, the film more preferably contains between 3 and 10% by weight (based on the total weight of the film) of white pigment. To achieve good running reliability and whiteness, the particle sizes $d_{50}$ used are generally between 0.05 and 5 µm and preferably between 0.1 and 1 µm (applies only to inorganic white pigments). The preferred white pigment is $TiO_2$, since this allows better weathering stabilities to be achieved. The titanium dioxide is preferably modified and/or coated with other element oxides. Preferred elements are Al, Si, V, P and Ca, and combinations thereof. Such pigments are described, for example, in U.S. Pat. No. 3,981,737 or EP0861299. White films have been found to be superior to clear films especially in outdoor applications. The reason for this also lies in the lesser damage to the stabilizers by light. It has therefore been found to be favorable when the films have a transparency (ASTM D1003) of <60%, preferably of <40%. In addition to the transparency in the visible region, it has been found to be favorable when the transparency in the UV-A at 370 nm is <20% and preferably <10% and ideally less than 5%.

In addition to the additives mentioned, the film may additionally comprise further components such as flame retardants (preferably organic phosphoric esters) and/or free-radical scavengers/antioxidants and/or UV stabilizers. A selection of suitable antioxidants and UV stabilizers can be found in FR2812299.

In addition to the inventive polyesters, the pigments (or less preferably, incompatible polymers as the white pigment), the hydrolysis stabilizers and chain extenders and further additives mentioned in the preceding paragraph, the film contains typically less than 5% by weight, more preferably less than 1% by weight and ideally no further additives at all, more particularly no further polymers since these generally worsen the mechanical properties in stretched films.

The inventive film contains a hydrolysis stabilizer, the proportion of the hydrolysis stabilizer being within the range from 0.25 to 20.0% by weight, preferably from 1.0 to 6.0% by weight and more preferably 1.5-5% by weight, based on the total weight of the film.

Suitable hydrolysis stabilizers are epoxidized fatty acid esters and/or epoxidized fatty acid glycerides.

Suitable epoxidized fatty acid glycerides are mixtures of glyceryl esters or pure glyceryl esters, the glyceryl esters preferably being described by the following formula:

$$CH_2OR_1\text{—}CHOR_2\text{—}CH_2OR_3 \qquad \text{Formula 1}$$

where R1 and R2 and R3 may be either the same or different.

$R_1$, $R_2$ and $R_3$ preferably follow the following formula:

$$\underset{}{\overset{O}{\underset{\|}{-C}}}\text{—}[(CH_2)_m\text{—}(\underset{O}{CH\text{—}CH})_n\text{—}(CHCH_3)_o]\text{—}R_E$$

where
$R_E = CH_3$ or H and
m=1-40, preferably 7-20, more preferably 10-16
n=0-10, preferably 1-4, more preferably 2-3
o=0-4, preferably 0.

On average, m is typically in the range from 9 to 16 and more preferably in the range from 11 to 13. n on average is typically in the range from 1 to 3 and more preferably from 1.5 to 2.75 and ideally from 2 to 2.5. o is preferably <0.5 on average.

The sequence of the individual methylene ($CH_2$)— (1), epoxy (CHOCH)— (2) and ($CHCH_3$)— (3) groups is as desired, though typically at least 2 methylene groups (1) and more preferably 7 methylene groups (1) follow on from the carbonyl group, before being followed by one or more of the (2) or (3) groups and then typically again by at least one methylene group (1).

$R_{1,2,3}$ radicals where m=0 are present in glyceryl ester mixtures to an extent of less than 30 and preferably to an extent of less than 20% by weight, and more preferably to an extent of less than 10% by weight (based on the total weight of the glyceryl esters).

One or more of the $R_1$ and $R_2$ and $R_3$ radicals may each independently also be defined as follows:
$R_{1,2,3}$=H
$R_{1,2,3}$=unsaturated (double bond-containing or not completely epoxidized) C8-C40 fatty acid
$R_{1,2,3}$=($PO_2$)—O—$(CH_2)_2$—$N(CH_3)_3$
$R_{1,2,3}$=other organic radical not definable in detail (since usually of biogenic origin);
though such glyceryl esters are less preferred, and glyceryl esters which contain these radicals are present in glyceryl ester mixtures typically to an extent of less than 20 and more preferably to an extent of less than 5% by weight; this means that the aforementioned preferred glyceryl esters are present in glyceryl ester mixtures typically to an extent of more than 80 and more preferably to an extent of more than 95% by weight.

Since the glyceryl esters used are typically epoxidized oils of biogenic origin, these comprise, as well as the glyceryl esters, usually also small amounts of other substances (proteins, etc.). The proportion of these substances is typically less than 10% by weight and preferably less than 2% by weight, based on the total weight of the hydrolysis stabilizers.

More particularly, the proportion of compounds having a boiling point below 210° C. is typically less than 5% by weight and preferably less than 1% by weight, based on the total weight of the hydrolysis stabilizers.

Suitable epoxidized fatty acid esters or mixtures of epoxidized fatty acid esters can be described by the following formula:

$$R_4OR_5 \qquad \text{Formula 2}$$

where $R_4$ is preferably described by the following formula:

$$\underset{}{\overset{O}{\underset{\|}{-C}}}\text{—}[(CH_2)_p\text{—}(\underset{O}{CH\text{—}CH})_q\text{—}(CHCH_3)_r\text{—}]\text{—}R_E$$

where
$R_E = CH_3$ or H and
p=1-40, preferably 7-20, more preferably 10-16
q=0-10, preferably 1-4, more preferably 2-3
r=0-4, preferably 0.

On average, p is typically in the range from 9 to 16 and preferably in the range from 11 to 13. q on average is typically in the range from 1 to 3 and preferably in the range from 1.2 to 2.5.

r is preferably <0.5 on average.

The sequence of the individual methylene ($CH_2$)— (1), epoxy (CHOCH)— (2) and ($CHCH_3$)— (3) groups is as desired, though typically at least 2 methylene groups (1) and more preferably 7 methylene groups (1) follow on from the carbonyl group, before being followed by one or more of the (2) or (3) groups and then typically again at least once by (1).

The $R_5$ radical is preferably described by the following formula 3:

$$-(CH_2)_s\text{—}R_6 \qquad \text{Formula 3}$$

where s=0-50, preferably 1-20 and more preferably 1-8;
$R_6$ is preferably
H or
$C_tH_{(2t+1)}$ where t=3-10, preferably 5-8, more preferably
—CH($CH_2$—$CH_3$)—$(CH_2)_3$—$CH_3$, especially in conjunction with s=1
O—$R_4$ where $R_4$ corresponds to the $R_4$ radical from formula 2.

$R_6$ may also be OH, but this embodiment is less preferred.

The epoxidized fatty acid esters contain typically less than 10% and preferably less than 5% by weight (based on the total weight of the fatty acid esters used) of further compounds not described by formula 2; this means that the aforementioned epoxidized fatty acid esters are present in mixtures of such esters typically to an extent of more than 90 and more preferably to an extent of more than 95% by weight.

The acid number of the hydrolysis stabilizers used is typically less than 10 and preferably less than 2 mg KOH per gram (DIN EN ISO 3682). The higher the acid number, the higher is the gel formation tendency in conjunction with the chain extenders used.

For the incorporation and for the effectiveness of the hydrolysis stabilizer action, it has been found to be favorable when the viscosity of the stabilizers used is greater than 300 mPa s, preferably greater than 500 mPa s and more preferably greater than 700 mPa s at 25° C. (DIN 53018). The lower the viscosity, the higher the risk of viscosity drops in the extrusion, which can lead to breakoffs.

Particularly suitable hydrolysis stabilizers are those which have an epoxy oxygen content of at least 1% by weight, preferably at least 5 and more preferably greater than 7.5% by weight, since this enhances the effectiveness of the hydrolysis stabilization based on the amount of stabilizer.

Suitable epoxidized fatty acid glycerides are, for example, epoxidized soybean oil, epoxidized linseed oil, epoxidized colza oil, epoxidized sunflower oil and epoxidized fish oil (the composition of the oils mentioned, especially the type and amount of the fatty acids present, is described, for example, in Römpp Chemie Lexikon, 10th edition, Georg Thieme Verlag, Stuttgart). Particular preference is given to using epoxidized linseed oil. The epoxidized fatty acid esters used are preferably the thermally stable 2-ethylhexyl esters of unsaturated fatty acids or fatty acid mixtures of the fatty acids forming the basis of colza oil, linseed oil, soybean oil or fish oil, which typically have epoxy contents of 1.5-15% by weight of epoxy oxygen (based on the epoxidized fatty acid esters), preferably 4-10% by weight.

It has been found to be favorable for the hydrolysis stability when the proportion of the fatty acid glycerides described by formula 1 in the total hydrolysis stabilizer content is >50% by weight. A particularly favorable proportion is >66% by weight and a most favorable proportion is >75% by weight. Since it has been found that the fatty acid glycerides are more effective hydrolysis stabilizers than the corresponding epoxidized fatty acid esters.

In addition, it has been found to be favorable when a stabilizer in the form of a free-radical scavenger is added to the film, since this counteracts the loss of active oxirane groups in the extrusion as a result of free-radical side reactions. Appropriately, the inventive film contains such stabilizers as free-radical scavengers or thermal stabilizers in amounts of 50 to 15 000 ppm, preferably 100 to 5000 ppm, more preferably 300 to 1000 ppm, based on the weight of the film. The stabilizers added to the polyester raw material are selected as desired from the group of the primary stabilizers, such as sterically hindered phenols or secondary aromatic amines, or the group of the secondary stabilizers such as thioethers, phosphites and phosphonites, and also zinc dibutyldithiocarbamate, or synergistic mixtures of primary and secondary stabilizers. Preference is given to the phenolic stabilizers. The phenolic stabilizers include especially sterically hindered phenols, thiobisphenols, alkylidenebisphenols, alkylphenols, hydroxybenzyl compounds, acylaminophenols and hydroxyphenyl propionates (corresponding compounds are described, for example, in "Kunststoffadditive" [Plastics Additives], 2nd edition, Gächter Müller, Carl Hanser-Verlag, and in "Plastics Additives Handbook", 5th edition, Dr. Hans Zweifel, Carl Hanser-Verlag). Particular preference is given to the stabilizers with the following CAS numbers: 6683-19-8, 36443-68-2, 35074-77-2, 65140-91-2, 23128-74-7, 41484-35-9, 2082-79-3, and also IRGANOX® 1222 from Ciba Specialties, Basle, Switzerland, preference being given in particular embodiments to the IRGANOX® 1010, IRGANOX® 1222, IRGANOX® 1330 and IRGANOX® 1425 types or mixtures thereof.

Surprisingly, it has been found to be more favorable when the free-radical scavenger is not added to the hydrolysis stabilizer but to the polyester raw material as early as in the course of polymer preparation.

In addition to the hydrolysis stabilizer, the film comprises a chain extender.

Chain extenders are molecules with at least two reactive groups which can react with the polyesters during the extrusion and join polyester chains to one another. They differ from the hydrolysis stabilizers (e.g. fatty acid epoxides, polymeric carbodiimides) in that their reactive groups are substantially (>75%) depleted as early as during the extrusion and are no longer available for a chain repair (elongation) during the use of the polyester film after the production thereof. The chain extenders are preferably selected from the groups of the bisoxazolines, the carbonyllactams, polyfunctional anhydrides (optionally combined with polyols) and the bi/polyfunctional terminal epoxides. "Bi/polyfunctional" describes the number of functional groups, i.e., for example, the number of epoxide, anhydride or alcohol groups; "terminal" means that the functional group, for example epoxide group, is present at the end of a chain or side chain.

Bisoxazolines (such as 1,3-PBO, sold by DSM (the Netherlands) under the brand name Allinco) were ineffective up to a concentration of 0.5% by weight (based on the total weight of the film) in combination with the inventive hydrolysis stabilizers. At higher concentrations (up to a concentration of 2% by weight), there was some degree of stabilization of the viscosity in the extrusion, but clear yellowing of the film occurred simultaneously and there was sweating of the particular oxazoline out of the film, which led to deposits on the rolls in the film production. Above 2% by weight, stable production was no longer possible. Bisoxazolines are therefore less preferred as chain extenders in the context of the invention.

Carbonylbiscaprolactam (CBC) is likewise sold as a chain extender under the Allinco brand name by DSM (the Netherlands). CBC is effective in combination with the inventive hydrolysis stabilizers in concentrations of 0.1 to 1.3% by weight (based on the total weight of the film). Below this the effect is too small and above this the result is gels and an abrupt viscosity rise in the extrusion. What is important is that the CBC is metered in simultaneously, at best mixed with the hydrolysis stabilizer(s), since, when they are absent, even a concentration of 0.6% by weight leads to abrupt viscosity rises in the extrusion with the consequence of breakoffs in production. The preferred use range of CBC is 0.2 to 0.5% by weight. Contrary to expectations, however, CBC also resulted in sweating with deposits on rolls and yellowing of the film. This effect is enhanced by the hydrolysis stabilizer. the hydrolysis rate of the films which contain CBC and other carbonyllactams is additionally slightly higher than that of the films without them. CBC and other carbonyllactams are therefore less preferred as chain extenders in the context of the invention.

Polyfunctional anhydrides (polyanhydride, polyfunctional=here, a plurality of anhydride functions) are suitable as chain extenders, both as an individual component and in combination with polyfunctional alcohols. Suitable polyanhydrides and polyalcohols are described in EP-A-1 054 031, whose United States equivalent is U.S. Pat. No. 6,469,078. Preference is given to using tetracarboxylic dianhydrides. Particular preference is given to pyromellitic anhydride. Preferred polyfunctional alcohols are glycol and pentaerythritol, particular preference being given to pentaerythritol.

The proportion of polyanhydride is appropriately less than 5% by weight (above this, risk of abrupt viscosity rises), preferably less than 1.5% by weight and more preferably less than 1% by weight (based on the total weight of the film). For an optimal action, the content should not go below 0.3% by weight.

It was possible to achieve particularly good viscosity stabilization when the proportion of polyalcohols is less than 2% by weight, preferably less than 1% by weight and more preferably less than 0.5% by weight (based on the total weight of the film).

Optionally, it is also possible to use phosphonates as described in EP-A-1 054 031. The proportion of such compounds is below 2% by weight and should preferably not exceed 0.2% by weight (based on the total weight of the film); ideally less than 0.05% by weight of such compounds are used.

The use of polyanhydrides and mixtures thereof with polyols and phosphonates leads to a stabilization of the viscosity in the extruder. On the other hand, the use of these compounds, however, also leads to a significant rise in the gel level, and the resulting films have a higher hydrolysis rate than films without chain extenders from this group. The hydrolysis rate rises especially with a rising proportion of phosphonate and slightly with a rising proportion of polyalcohol.

Preferred chain extenders in the context of the invention are difunctional epoxides and more preferably polyfunctional epoxides ("functional" here describes the number of epoxy functions). The epoxy function is arranged terminally at the end of the molecule chain or of a side chain (=epoxidic chain extenders).

The terminal epoxy functions are preferably described by formula 4.

Formula 4

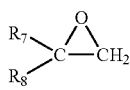

$R_7$ and $R_8$ may be any organic radicals (aliphatic or aromatic or combinations thereof), where $R_7$ is preferably H.

Polyfunctional epoxides are preferred over bifunctional epoxides, since smaller use amounts are required, higher molecular weight end products form and there is a lower level of gaseous cleavage products. The number of epoxy groups in the molecule is greater than 1, preferably greater than 2 and more preferably greater than 5. The number of epoxy functions per molecule is typically <100, preferably <20 and ideally <10. The greater the number of epoxy functions, the greater the chain-extending effect, but also the greater the tendency to form gels.

The epoxy equivalent weight in g/mol (molecular weight/number of epoxy functions) is typically >200, preferably >300 and ideally >425. It is typically <2000 and preferably <1000. The higher the epoxy equivalent weight, the lower the tendency to form gels. With rising epoxy equivalent weight, however, more of the compound in % by weight is required to achieve an effective viscosity rise.

The molecular weight of the epoxidic chain extenders is typically >1500, preferably >2000 and ideally >3000. It is typically <15 000, preferably <10 000 and ideally <5000. The best incorporation into the polyester matrix is achieved within the molecular weight range specified. The epoxidic chain extenders are preferably liquid at room temperature.

Molecular weight, number of epoxy groups and epoxy equivalent weight may be selected independently of one another. Particularly suitable chain extenders are those in which all three properties are within the ideal range.

Bisphenol-containing epoxides such as those of the Araldite series or the corresponding Epon products are less preferred, since they contain bisphenol A in the structure and can give it off, which can be detected in the ambient air.

Preferred epoxides are co- or terpolymers of glycidyl methacrylate and ethylene and/or esters of acrylic acid. Such epoxides are sold, for example, under the brand name LOTADER® by Arkema France. In this context, especially LOTADER® AX8840, AX8900 and AX8950 are suitable. However, polymers of the LOTADER® series which do not contain any glycidyl groups are unsuitable.

Especially unsuitable are polymers which contain maleic anhydride-containing monomers instead of the glycidyl groups. Generally, polymers which contain maleic anhydride-containing monomers are less suitable since they tend to have significant gel formation in conjunction with the hydrolysis stabilizers. A process technology disadvantage of the otherwise suitable compounds of the LOTADER® series is that they are solid at room temperature and therefore cannot be mixed with the hydrolysis stabilizers. They first have to melt in order to react and do not have good miscibility with the polyesters. As a result, relatively high use amounts of appropriately >2% by weight, preferably >4% by weight (based on the total weight of the film) are required in order to achieve good viscosity stabilization. With increasing dosage, however, there is a rise in the risk of gel formation and the risk of rapid viscosity rises, with the risk of production shutdowns and in extreme cases even of damage to extrusion components. At a dosage of >10% by weight, there is severe gel formation.

Particularly preferred chain extenders in the context of the invention are polymers which are described by formula 5. Formula 5:

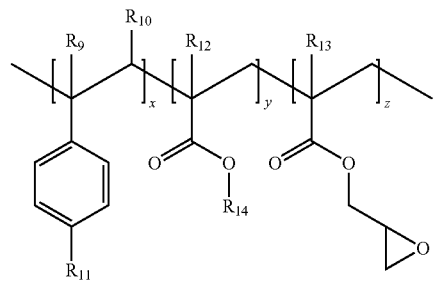

$R_9$-$R_{13}$ are each independently H or a C1 to C12-alkyl radical, preferably —$CH_3$.

$R_{14}$ is a C1 to C12-alkyl group, preferably $CH_3$.

x and y are each in the range from 0 to 100 and preferably in the range from 1 to 20.

x+y is greater than 0 and preferably greater than 10.

z is in the range from 2 to 100, preferably in the range from 3 to 20 and more preferably in the range from 3 to 10.

These figures are based on the average of the polymers used, since individual polymer chains may have monomer proportions distributed randomly therein which may deviate from the preferred ranges.

These compounds feature particularly good incorporation into the polyester matrix and simultaneously have very good chain-extending action with low gel formation tendency.

Such polymers are sold by BASF under the brand name JONCRYL® ADR. Particular preference is given to the liquid products.

These polymers are typically metered in in an amount of less than 2% by weight and more preferably in an amount of less than 1.2% by weight. Typically at least 0.1% by weight and more preferably at least 0.5% by weight (based on the total weight of the film) is metered in.

The films comprising hydrolysis stabilizer and chain extender within the inventive ranges are more hydrolysis-stable than films without hydrolysis stabilizer.

The preferred and particularly preferred chain extenders based on epoxy groups were surprisingly the only chain extenders which, in the resulting films, did not lead to a higher hydrolysis rate compared to films without chain extender. It was likewise surprising that these epoxy-containing chain extenders do not react preferentially with the likewise epoxidic hydrolysis stabilizers in the extrusion, which would lead to gels (and reduced hydrolysis stabilization as a result of the depleted hydrolysis stabilizer) and not to a chain extension. In view of the known homopolymerization tendency of epoxides at the processing temperatures, this would have been expected.

The hydrolysis stabilizer and the chain extenders lower the mechanical stability and elongation at break of the biaxially stretched polyester films. They additionally tend to lead to a lower dielectric strength in the preferred electrical insulation applications. In order to counteract this disadvantageous tendency, the sum of hydrolysis stabilizer and chain extender is appropriately <12% by weight, preferably <8% by weight and ideally <6% by weight (based on the total weight of the film). The sum of chain extender and hydrolysis stabilizer should appropriately be at least 1% by weight and preferably at least 2% by weight, in order that effective hydrolysis stabilization and homogeneous mixing into the polymer matrix are ensured.

Hydrolysis stabilizer and chain extender are preferably metered directly into the extruder in the course of film production. It is particularly preferred when hydrolysis stabilizer and chain extender are premixed and metered together into the extruder. It is thus possible to particularly effectively prevent an abrupt viscosity rise in the extrusion, since the chain extenders are always present alongside the hydrolysis stabilizers which tend to reduce the (melt) viscosity. Preference is given to using multiscrew extruders (at least 2 screws).

Hydrolysis stabilizers and the chain extender can also be introduced by means of masterbatch technology. In other words, the hydrolysis stabilizer and/or the chain extender is/are introduced (together or separately) into the polymer in an extruder (preferably a multiscrew extruder). This polymer is/these polymers are then extruded again in pure form in the film production, or mixed with other polymers. However, this process is less preferred since hydrolysis stabilizer is consumed (depleted) as early as in the first extrusion step, and is then no longer available as an active substance in the film. The same applies especially to the chain extenders, whose activity is reduced massively even in the case of particularly gentle extrusion conditions as a result of the masterbatch production.

The film according to the invention is generally produced by extrusion processes known per se and has one or more layers, in which case the hydrolysis stabilizer may be present in all layers, though embodiments in which not all layers are modified with the hydrolysis stabilizer are also possible.

The film thickness is preferably between 11 and 500 μm and more preferably between 24 and 300 μm. In multilayer embodiments, the sum of the thicknesses of the hydrolysis stabilizer-containing layers is preferably greater than 10 μm and less than 500 μm and more preferably >40 μm and less than 300 μm. In the case of very thick layers, irregularities in viscosity if anything occur in production. Total layer thicknesses of the hydrolysis stabilizer-containing layers below the preferred range are generally insufficient in outdoor applications (when only one such film layer is used) to stabilize the entire film sufficiently over the expected use period.

In a preferred embodiment, the film comprises, at least on one side, preferably on both sides, a top layer which does not contain any hydrolysis stabilizer. These layers are preferably configured as thin as possible in order to impair the hydrolysis stability of the overall film as little as possible. In other words, these layers are preferably each thinner than 5 μm, and more preferably thinner than 3 μm and ideally thinner than 0.8 μm. However, it has been found to be favorable when the layer is not thinner than 0.1 μm (below 0.1 μm, there is no longer a sufficient barrier to the migration of the hydrolysis stabilizers).

The hydrolysis stabilizer-free layers may in principle contain the same polymers and additives (with the exception of the hydrolysis stabilizers described) as the layer(s) which contain(s) the hydrolysis stabilizer. However, it has been found to be favorable when the polyester raw material of the hydrolysis stabilizer-free layers has a minimum content of carboxyl end groups. Such raw materials are described, inter alia, in EP-A-0 738 749, whose United States equivalent is U.S. Pat. No. 6,020,056. In a preferred embodiment, the carboxyl content expressed in mmol $H^+$/kg of polymer (weighted mean of all polymers used) is less than 25 and more preferably less than 15 and ideally <8 mmol$H^+$/kg of polymer. Such values can be achieved, for example, by solid-state condensation, or by end-capping. The viscosity of the raw materials used is typically between an IV of 0.61 and 0.75 (IV measured in trichloroethane/phenol as described in U.S. Pat. No. 3,432,591). Higher IV values, as described, for example, in EP-A-0 738 749, have been found to be unfavorable if anything in practice, since the high viscosities in the extruder require higher temperatures or higher shear rates, and the hydrolysis tendency of the melt thus increases. The IV values of the raw materials used in the layer(s) with hydrolysis stabilizer should likewise preferably be 0.61-0.75. More particularly, it has been found to be favorable when the difference between the IV values of the stabilizer-containing layer (in the case of layers, the mean) and the IV values of the layer without hydrolysis stabilizer (in the case of layers, the mean) is not greater than 0.1 and preferably not greater than 0.03. The preferred embodiment with at least one hydrolysis stabilizer-free top layer leads, in production, to a lower level of odor nuisance as a result of the fatty acid epoxides used and is better metallizable and laminatable (i.e. metals and adhesives adhere better to this layer).

In the process for producing the inventive films, the procedure is appropriately to extrude the corresponding melts through a flat die, to consolidate the film thus obtained by drawing it off and quenching it on one or more roll(s) (chill rolls) as a substantially amorphous preliminary film, then to reheat and biaxially stretch (orient) the film and heatset the biaxially stretched film. In the extrusion area, it has been found to be favorable when temperatures of 295° C. are not exceeded. It is particularly favorable when the region of the die and especially the region of the die lip and the vicinity thereof are not hotter than 290° C., preferably not hotter than 285° C. and more preferably not hotter than 275° C. The higher the temperature, the higher the thermal stress on the stabilizers and the higher the tendency to form gel. A higher temperature at this point additionally increases the amount of hydrolysis stabilizer which escapes.

The biaxial stretching is generally performed sequentially. This preferably involves stretching first in longitudinal direction (i.e. in machine direction, =MD) and then in transverse direction (i.e. at right angles to machine direction, TD). This leads to an alignment of the molecule chains. Stretching in longitudinal direction can be performed with the aid of two rolls running at different speeds according to the stretching ratio desired. For transverse stretching, an appropriate tenter frame is generally used.

The temperature at which the stretching is performed may vary within a relatively wide range and is guided by the desired properties of the film. In general, the longitudinal stretching and also the transverse stretching are performed at $T_g+10°$ C. to $T_g+60°$ C. ($T_g$=glass transition temperature of the film). The longitudinal stretching ratio is generally in the range from 2.0:1 to 6.0:1, preferably 3.0:1 to 4.5:1. The transverse stretching ratio is generally within a range from 2.0:1 to 5.0:1, preferably 3.0:1 to 4.5:1, and any second longitudinal and transverse stretching performed is at 1.1:1 to 5.0:1.

The longitudinal stretching can optionally be performed simultaneously with the transverse stretching (simultaneous stretching). It has been found to be particularly favorable when the stretching ratio in longitudinal and transverse direction is in each case greater than 3.0.

In the course of the subsequent heatsetting, the film is kept at a temperature of 150 to 260° C., preferably 200 to 245° C., for about 0.1 to 10 s. Subsequently to, or commencing within, the heatsetting, the film is relaxed by 0 to 15%, preferably by 1.5 to 8%, in transverse direction and optionally also in longitudinal direction, and then the film is cooled and wound in a customary manner.

A film produced in this way has a significantly lower hydrolysis tendency both at room temperature and at temperatures up to 210° C. than an unmodified polyester film. Compared to the films described in EP-A-1 634 914 with epoxidized fatty acids as hydrolysis stabilizers without chain extenders, it was possible to significantly enhance productivity, since no downward viscosity peaks occur any longer in the extrusion, which lead to breakoffs in production.

The stabilization is substantially independent of the film thickness and the temperature within a measurement range from 25 to 210° C.

The inventive films still have an SV of more than 500 after 96 h in an autoclave with steam saturation at 110° C. and are thus still mechanically stable, whereas an unstabilized film after this time has already fallen below SV 400 and therefore has as good as no flexural breaking strength any longer. The stabilized film survives under the conditions mentioned for 300% longer before it attains the critical limit of 400 SV units. The same relative prolonged lifetime is also found at 80° C. and at 170° C.

Films stabilized by means of the hydrolysis stabilizers and chain extenders mentioned are outstandingly suitable for production of products which contain polyester films and are either designed for a long lifetime (greater than 1 year) or which are confronted during use by higher temperatures (greater than 80° C.), especially at high humidity (greater than 50% rel. humidity) and for outdoor applications.

A further application is, for example, ribbon cables in automobiles. For this purpose, films (preferably with thicknesses in the range of 12-200 µm) are laminated with copper by means of a heatsealing adhesive (e.g. EKP-HEIβSIEGEL-LACK® 230 from EKP Verpackungslacke GmbH (Germany)). Composites which comprise polyesters with hydrolysis stabilizers and chain extenders withstand the mechanical stresses (including vibrations) which occur in automobiles for much longer than composites comprising conventional polyester films. However, it should be ensured here that the adhesives are also substantially hydrolysis-insensitive (in polyester-based adhesives, modification with the hydrolysis stabilizers mentioned is advisable).

A further preferred application is use in the backside laminate of solar modules. It has been found to be favorable here when the shrinkage of the film (at 150° C., 30 min) in MD is <1.5% and in TD is <1.2%. Since the stabilizers used tend to lead to an increase in the shrinkage values, it has been found to be favorable when the sum of the percentages by weight of hydrolysis stabilizer and chain extender is within the preferred ranges, and/or when the maximum setting temperature is >225° C. and the film is relaxed by more than 4% in transverse direction. The thickness of films used in solar modules is preferably >25 µm and more preferably >45 µm.

In a preferred embodiment for electrical insulation applications (for example cables and backside laminates of solar modules), the film has a modulus of elasticity in both directions of greater than 3000 N/mm² and more preferably a modulus of elasticity of greater than 4000 N/mm² and ideally greater than 4500 N/mm² in both directions. This has the advantage of better electrical insulating action compared to materials with a lower level of orientation. These values are achieved, for example, when the sum of the percentages by weight of hydrolysis stabilizer and chain extender is within the preferred ranges, especially when the stretching ratio in both directions is greater than 3.1 or better greater than 3.3.

In a preferred embodiment for electrical insulation applications (for example cables and backside laminates of solar modules), the film has a density of greater than 1.1, more preferably of greater than 1.3 and ideally of greater than 1.4 g/cm³. Like the high mechanical strength, this improves the electrical insulating action. This can be achieved, for example, by virtue of the sum of the percentages by weight of hydrolysis stabilizer and chain extender being within the preferred ranges and/or when the maximum setting temperature is at least 200° C.

In the working examples which follow, the individual properties are measured according to the standards and methods listed.

Test Methods

Standard Viscosity (SV)

The standard viscosity SV is—based on DIN 53726—measured by the measurement of the relative viscosity $\eta_{rel.}$ of a 1% by weight solution in dichloroacetic acid (DCE) in an Ubbelohde viscometer at 25° C. The SV is defined as follows:

$$SV=(\eta_{rel.}-1)\cdot 1000$$

Shrinkage

Thermal shrinkage is determined on square film specimens with an edge length of 10 cm. The samples are cut out such that one edge runs parallel to machine direction and one edge at right angles to machine direction. The samples are measured accurately (the edge length $L_0$ is determined for each machine direction TD and MD, $L_{0\ TD}$ and $L_{0\ MD}$) and heat treated in a forced-air drying cabinet at the given shrinkage temperature (here, 200° C.) for 15 min. The samples are removed and measured accurately at room temperature (edge length $L_{TD}$ and $L_{MD}$). The shrinkage is calculated from the equation $$\text{Shrinkage [\%] } MD=100\cdot(L_{0\ MD}-L_{MD})/L_{0\ MD}$$

$$\text{Shrinkage [\%] } TD=100\cdot(L_{0\ TD}-L_{TD})/L_{0\ TD}$$

Measurement of Transparency

The measurement is effected on a HAZE-GARD® Plus from BYK Gardner Instruments to ASTM D 1003.

Measurement of Transparency at 370 nm

The transparency is measured with a LAMBDA® 3 UV/Vis spectrometer from Perkin Elmer.

Measurement of Density

Density can be determined in a gradient column (e.g. carbon tetrachloride and hexane) or by means of a gas pycnometer (helium or nitrogen).

Measurement of Mean Particle Diameter Ds on Particles Before Introduction into the Raw Material The determination of the mean particle diameter $d_{50}$ was carried out by means of a laser on a MASTER SIZER® (Malvern Instruments, UK) by the standard method (other measuring instruments are, for example, Horiba LA® 500 (Horiba Ltd., Japan) or HELOS®(Sympatec GmbH, Germany), which use the same measurement principle). To this end, the samples were placed into a cuvette with water which was then placed into the measuring instrument. The measuring operation is automatic and also includes the mathematical determination of the $d_{50}$. By definition, the $d_{50}$ is determined from the (relative) cumulative curve of the particle size distribution: the point of intersection of the 50% ordinate value with the cumulative curve provides the desired $d_{50}$ value on the abscissa axis.

Measurement of the Mechanical Properties of the Film

The mechanical properties are determined to DIN EN ISO 527-1 to 3.

Autoclaving

The films (10×2 cm) are hung in the autoclave (Adolf Wolf SANOklav ST-MCS-204) on a wire and the autoclave is filled with 2 l of water. After the autoclave has been closed, it is heated. At 100° C., the air is displaced through the outlet valve by the water vapor. This is closed after approx. 5 min, and then the temperature rises to 110° C. and the pressure to 1.2-1.5 bar. After the time set, the autoclave is switched off automatically and, after opening the outlet valve, the films are removed. The SV is then determined thereon.

EXAMPLES

Hydrolysis Stabilizer 1 (HStab 1)

Epoxidized linseed oil with an epoxy oxygen content of 8.9% from Arkema USA. Linseed oil corresponds to formula 1 with the variables within the orders of magnitude specified there.

Hydrolysis Stabilizer 2 (HStab 2)

2-Hexylethyl ester of linseed oil ((2-hexylethyl) ester of the linseed oil fatty acids) with an epoxy oxygen content of 7% from Arkema USA. HStab2 corresponds to formula 2 with the variables within the orders of magnitude specified there.

Chain Extender 1

JONCRYL® 4380 (liquid at room temperature) with a molecular weight of 3300 and an epoxy equivalent weight of 450 g/mol. JONCRYL® 4380 corresponds to formula 5 with the variables within the orders of magnitude specified there.

Further Raw Materials Used

| Raw material R1 | PET (polyethylene terephthalate from Invista Deutschland), SV 790 and a carboxyl end group content of 22 mmol/kg and a diethylene glycol content of 0.75% by weight |
|---|---|
| Masterbatch MB1 | 20% by weight of TiO$_2$ (HOMBITAN ® LW-SU from Sachtleben Deutschland) and 80% by weight of PET; SV 790; DEG content of 1% by weight and a carboxyl end group content of 42 mmol/kg (addition of TiO$_2$ by incorporation in a twin-screw extruder). |

Film Production:

Thermoplastic chips (MB1 and R1) were mixed in the ratios specified in the examples and extruded at 278° C. in a twin-screw extruder (JapanSteelWorks). The hydrolysis stabilizers were metered directly into the extruder intake by means of a pump. The molten polymer was drawn off by means of a draw roller from a nozzle. The film was stretched at 116° C. in machine direction by a factor of 3.4, and a transverse stretching by a factor of 3.3 was conducted in a frame at 110° C. Subsequently, the film was heatset at 225° C. and relaxed in transverse direction by 6% at temperatures of 200 to 180° C. The final film thickness was 50 μm.

The properties of the films produced can be found in the table which follows:

TABLE

|  |  | Example 1 | Comparative example 1 |
|---|---|---|---|
| R1 | in % by wt. | 60 | 60.6 |
| MB1 | in % by wt. | 36 | 36 |
| HStab 1 | in % by wt. | 3.0 | 3.0 |
| HStab 2 | in % by wt. | 0.4 | 0.4 |
| Chain extender 1 | in % by wt. | 0.6 | 0.0 |
| Film thickness | in μm | 50 | 50 |
| SV (after film production) |  | 786 | 756 |
| SV after 96 h at 110° C. in an autoclave with water saturation |  | 635 | 607 |
| Modulus of elasticity MD/TD | in N/mm$^2$ | 4750/4670 | 4870/4730 |
| Shrinkage in MD/TD | in % | 0.9/0.1 | 0.8/0.0 |
| Density | in g/cm$^3$ | 1.41 | 1.42 |
| Transparency to ASTM D1003/transparency at 370 nm | in % | 29/0.5 | 30/0.5 |
| Viscosity drops during production in extrusion causing breakoff | Production time 24 h | none | 7 |

The invention claimed is:

1. A biaxially oriented polyester film comprising (i) polyester, (ii) 0.25-6% by weight, based on the weight of the film, of hydrolysis stabilizer based on epoxidized fatty acid esters and/or epoxidized fatty acid glycerides, and (ii) a chain extender having a polymer of formula 5 formula 5

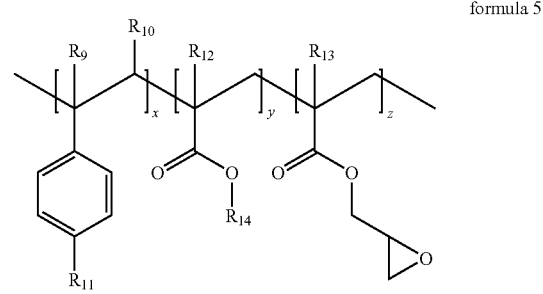

where
$R_9$-$R_{13}$ are each independently H or a C1-C12-alkyl radical,
$R_{14}$ is a C1-C12-alkyl group,
x and y are each independently selected from 0 to 100,
x+y is greater than 0 and
z is from 2 to 100;
wherein the sum of the hydrolysis stabilizer and the chain extender ranges from at least 1% by weight to less than 12% by weight, based on the weight of the film;
and wherein more than 80% by weight of the epoxidized fatty acid glycerides are mixtures of glyceryl esters of the formula 1: $CH_2OR_1$—$CHOR_2$—$CH_2OR_3$
where the $R_1$, $R_2$ and $R_3$ radicals are each independently defined as follows

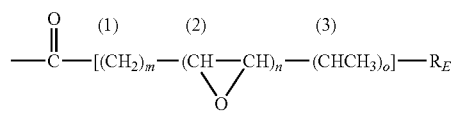

where $R_E$=$CH_3$ or H and
m=1-40 n=0-10
o=0-4
and where the sequence of the individual methylene (CH$_2$)—(1), epoxy (CHOCH)—(2) and (CHCH$_3$)—(3) groups is independently selected,
and where R$_{1,2,3}$ radicals where m=0 are present in glyceryl ester mixtures to an extent of less than 30% by weight, based on the total weight of the glyceryl esters,
and where at least one said glyceryl ester includes at least one epoxidized fatty acid moiety;
and wherein the film exhibits a modulus of elasticity in both directions of greater then 3000 N/mm$^2$;
and wherein the film has standard viscosity (SV) of more than 500 after 96 hours in an autoclave with steam saturation at 110° C.;
and wherein the hydrolysis stabilizer is a mixture of epoxidized fatty acid esters and epoxidized fatty acid glycerides and the proportion of the fatty acid glycerides described by formula 1 in the overall hydrolysis stabilizer content is >50% by weight.

2. A biaxially oriented polyester film comprising (i) a polyester, (ii) a hydrolysis stabilizer based on epoxidized fatty acid esters and/or epoxidized fatty acid glycerides, and (iii) from 0.1 to less than 1.2% by weight of a chain extender, based on the weight of the film;
wherein the sum of the hydrolysis stabilizer and the chain extender ranges from at least 1% by weight to less than 12% by weight, based on the weight on the weight of the film;
and wherein the chain extender consist of a polymer of the formula 5 formula 5

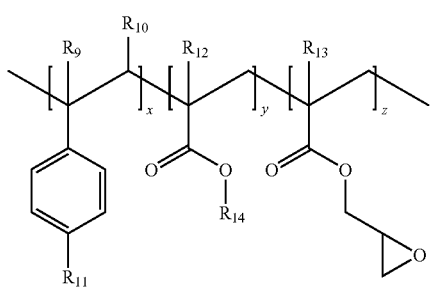

where
R$_9$-R$_{13}$ are each independently H or a C1-C12-alkyl radical,
R$_{14}$ is a C1-C12-alkyl group,
x and y are each independently selected from 0 to 100,
x+y is greater than 0 and
z is from 2 to 100;
and wherein the film exhibits a modulus of elasticity in both directions of greater than 4000 N/mm$^2$ and said film has a hydrolysis rate that is not higher than sad film without said chain extender;
and wherein the film includes more than 80% by weight of the epoxidized fatty acid glycerides that are mixtures of glyceryl esters of the formula 1: CH$_2$OR$_1$—CHOR$_2$—CH$_2$OR$_3$
where the R$_1$, R$_2$ and R$_3$ radicals are each independently defined as follows

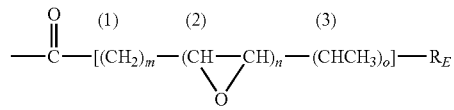

where
R$_E$=CH$_3$ or H and
m=1-40
n=0-10
o=0-4
and where the sequence of the individual methylene (CH$_2$)—(1), epoxy (CHOCH)—(2) and (CHCH$_3$)—(3) groups is independently selected,
and where R$_{1,2,3}$ radicals where m=0 are present in glyceryl ester mixtures are present to an extent of less than 30% by weight, based on the total weight of the glyceryl esters,
said epoxidized fatty acid glycerides of the formula 1 are present in an amount greater than 50% by weight within the hydrolysis stabilizer,
and where at least one said glyceryl ester includes at least one epoxidized fatty acid moiety;
and wherein said film has an SV of more than 500 after 96 hours in an autoclave with steam saturation at 110° C.

3. The polyester film as claimed in claim 1, wherein the polyester has a carboxyl end group content of >3 mmol/kg.

4. The polyester film as claimed in claim 1, wherein said film is white.

5. The polyester film as claimed in claim 1, wherein said film comprises one or more additives selected from inorganic particles, organic particles, flame retardants, free-radical scavengers, antioxidants or UV stabilizers.

6. The polyester film as claimed in claim 5, further comprising less than 5% by weight of further polymers.

7. The polyester film as claimed in claim 1, wherein more than 90% by weight of the epoxidized fatty acid esters are esters of the formula 2:
formula 2: R$_4$OR$_5$
where R$_4$ is defined as follows:

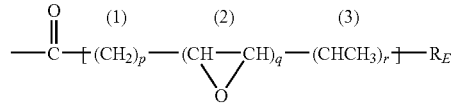

where
R$_E$=CH$_3$ or H and
p=1-40
q=1-10
r=0-4
and where the sequence of the individual methylene (CH$_2$)—(1), epoxy (CHOCH)—(2) and (CHCH$_3$)—(3) groups is independently selected and where
the R$_5$ radical is described by the following formula 3:

—(CH$_2$)$_s$—R$_6$      formula 3 where
s=0-50
R$_6$=H, OH or C$_t$H$_{(2t+1)}$ where t=3-10 or
O—R$_4$, where R$_4$ corresponds to the R$_4$ radical from formula 2.

8. The polyester film as claimed in claim 1, wherein the acid number of the hydrolysis stabilizers is less than 10 mg KOH per gram as determined via DIN EN ISO 3682.

9. The polyester film as claimed in claim 1, wherein the hydrolysis stabilizers have an epoxy oxygen content of at least 1% by weight.

10. The polyester film as claimed in claim 1, wherein the epoxidized fatty acid glyceride is selected from one or more epoxidized oils from the group consisting of epoxidized soybean oil, epoxidized linseed oil, epoxidized colza oil, epoxidized sunflower oil and epoxidized fish oil.

11. The polyester film as claimed in claim 1, wherein the epoxidized fatty acid ester is selected from one or more epoxidized fatty acid esters from the group consisting of the 2-ethylhexyl ester of unsaturated fatty acids or fatty acid mixtures of the fatty acids forming the basis of colza oil, linseed oil, soybean oil and fish oil.

12. A biaxially oriented polyester film as claimed in claim 1, wherein said film has a transparency in the visible region of less than 60% determined via ASTM D1003 and a transparency at 370 nm of less than 20%.

13. The polyester film as claimed in claim 1, wherein the chain extender is present in the film in an amount ranging from at least 0.5% by weight to less than 1.2% by weight, based on the total weight of the film.

14. The polyester film as claimed in claim 13, wherein the chain extender has at least two reactive groups which, during the extrusion of the polyester-stabilizer-extender mixture, reacts with the polyester and crosslinks polyester chains to one another, and which differs from hydrolysis stabilizers in that the chain extender reactive groups are substantially depleted as early as during extrusion and are no longer available for a chain repair and/or extension after polyester film production.

15. A process for producing the polyester film as claimed in claim 1 comprising extruding melts of a mixture of said polyester, said hydrolysis stabilizer, and said chain extender through a flat die, consolidating the extruded melt by drawing it off and quenching it on one or more chill rolls, thereby forming substantially amorphous preliminary film, reheating and biaxially stretching the substantially amorphous preliminary film and heatsetting the biaxially stretched film and rolling the heatset film up, wherein said film contains 0.25-6% by weight, based on the weight of the film, of said hydrolysis stabilizer based on epoxidized fatty acid esters and/or epoxidized fatty acid glycerides, and a chain extender.

16. An outdoor film, a ribbon cable, a backside laminate of solar modules or an electrical insulation film comprising polyester film as claimed in claim 1.

* * * * *

UNITED STATES PATENT AND TRADEMARK OFFICE
CERTIFICATE OF CORRECTION

PATENT NO. : 8,710,121 B2  
APPLICATION NO. : 12/384240  
DATED : April 29, 2014  
INVENTOR(S) : Holger Kliesch et al.

Page 1 of 1

It is certified that error appears in the above-identified patent and that said Letters Patent is hereby corrected as shown below:

In the Claims

In Column 16, Line 26,     after "of" insert --a--.

In Column 17, Line 59,     change "sad" to --said--.

In Column 19, Line 19,     change "1" to --2--.

Signed and Sealed this  
First Day of July, 2014

Michelle K. Lee  
*Deputy Director of the United States Patent and Trademark Office*